Figure 1:
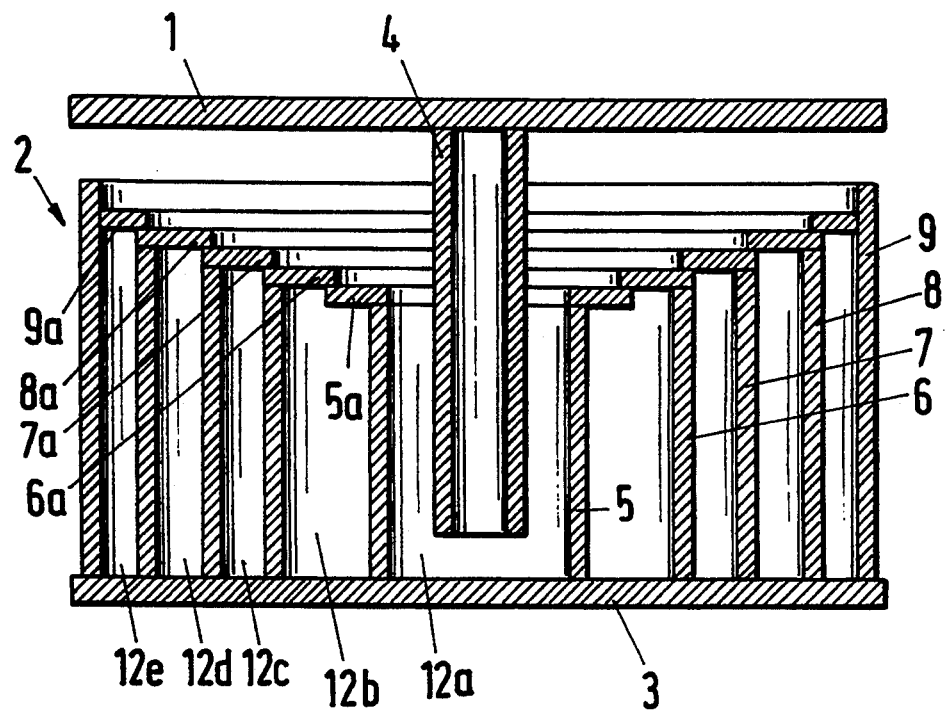

United States Patent [19]
Delam et al.

[11] Patent Number: 5,379,991
[45] Date of Patent: Jan. 10, 1995

[54] HORIZONTALLY AND VERTICALLY ACTING VISCOUS VIBRATION DAMPER

[75] Inventors: Heinz Delam; Frank-Michael Weber, both of Berlin, Germany

[73] Assignee: Gerb Schwingungsisolierungen GmbH & Co. KG., Berlin, Germany

[21] Appl. No.: 16,930

[22] Filed: Feb. 12, 1993

[30] Foreign Application Priority Data

Feb. 12, 1992 [DE] Germany ............... 4204129

[51] Int. Cl.[6] .............. F16M 1/00; F16F 11/00
[52] U.S. Cl. .................. 267/136; 267/140.5; 188/322.5; 248/562
[58] Field of Search .............. 267/64.26, 140.5, 136, 267/141.2, 141.6, 121, 226, 124, 113, 256; 248/562, 565, 631, 636; 188/266, 293, 322.5

[56] References Cited

U.S. PATENT DOCUMENTS

| | | | |
|---|---|---|---|
| 2,583,080 | 1/1952 | Beerli | 267/121 X |
| 2,597,800 | 5/1952 | Hussman | 248/565 |
| 4,648,577 | 3/1987 | Weber | 188/380 X |

FOREIGN PATENT DOCUMENTS

| | | | |
|---|---|---|---|
| 3010520 | 9/1981 | Germany | 248/565 |
| 3314203A1 | 10/1984 | Germany . | |
| 238427A1 | 8/1986 | Germany . | |
| 3507835A1 | 10/1986 | Germany . | |
| 4023930A1 | 2/1992 | Germany | 188/266 |
| 1425691 | 2/1976 | United Kingdom . | |
| 1509223 | 5/1978 | United Kingdom . | |
| 1073404 | 2/1984 | U.S.S.R. . | |
| 1190112 | 11/1985 | U.S.S.R. | 267/136 |
| 1295079 | 3/1987 | U.S.S.R. | 267/136 |
| WO90/10802 | 9/1990 | WIPO . | |

*Primary Examiner*—Robert J. Oberleitner
*Assistant Examiner*—Kevin D. Rutherford
*Attorney, Agent, or Firm*—Robbins, Berliner & Carson

[57] ABSTRACT

In the case of a horizontally and vertically acting viscous vibration damper for damping vibrations of large masses exhibiting large amplitudes, at least one tube is disposed within the damper casing filled with viscous damping medium. Although this tube is able to move freely in the horizontal direction, i.e. parallel to the damper casing base, it is prevented from moving in the axial direction. The damping characteristics are thereby maintained, even in the event of vertical vibration movements.

8 Claims, 3 Drawing Sheets

HORIZONTALLY AND VERTICALLY ACTING VISCOUS VIBRATION DAMPER

The invention relates to a horizontally and vertically acting viscous vibration damper.

In the case of a damper of this type known from WO 90/10802, cylindrical tubes are inserted, such that they surround one another and are mutually displaceable, between the inner wall of the cylindrical damper casing and the cylindrical or cupular damper plunger. The damper casing is attached by its baseplate to a fixed point, whilst the damper plunger is connected by an upper plate to the object to be protected. If relative movements occur between the fixed point and the object, then the vibration damper develops forces which are substantially proportional to the velocity of this movement. The most important characteristic value of viscous dampers of this type is the damping resistance W, which links the damper force F to the velocity v according to the formula $F = W^{30} v$.

In the case of this vibration damper, a sufficient damping effect is only obtained if the movement occurs at right-angles to the cylinder axis of the damper casing or the tubes, i.e. corresponds to a horizontal movement, whereas a vertical movement can easily result in upward movements of the tubes, the damping resistance in the vertical direction then approaching a value which is achieved even without the tubes.

A similar effect is also produced if very large horizontal relative movements occur. In this case in fact, the viscous damping medium is forced upwards at the rim of the damper casing and is able to flow back, depending upon the viscosity of the damping medium and the particular damper geometry, only relatively slowly. If a sinusoidal excitation, for example, is assumed, then the damping medium is forced further upwards with each load cycle. In trials it has been observed that the freely movable tubes in the interior of the damper casing were also forced upwards with the damping medium, the performance of the damper showing a rapid decline.

The object of the invention is to design the vibration damper of the generic type specified in the introduction such that the damping effect is not reduced in the case of any excitations or movement patterns.

This object is achieved according to the invention by the features of the defining part of claim 1.

As a result of this configuration, the at least one tube in the interior of the damper casing is prevented from being raised from the base surface of the damper casing under certain excitation conditions, thereby ensuring that the damping effect is maintained irrespective of the particular type of excitation or vibration movement.

The supporting parts can expediently be configured as an annular flange. In this case, where a plurality of tubes are used, the annular flange of the innermost tube should be aligned outwards and all other annular flanges should be aligned inwards.

Where a plurality of tubes are used which surround one another at a distance and in which the interspaces between the tubes, filled with viscous damping medium, can be at least partially filled, the diameters of the free peripheral areas of the annular flanges should be dimensioned such that the free peripheral area of each annular flange bears against the adjacent annular flange or its free peripheral area.

In particular, the outer diameter of the annular flange of a tube is designed to be greater than the inner diameter of the flange of the tube which directly follows outwardly in the radial direction. In all cases, however, the annular flange of the circumferential wall of the damper casing serves as an abutment in order to provide axial support for the tubes.

A further embodiment consists furthermore in the fact that although a plurality of tubes are once again disposed at a distance apart and concentrically to one another in the damper casing, the supporting parts of all tubes are configured as a one-piece annular disk common to all tubes and the supporting part of the circumferential wall as an inwardly directed annular flange, the diameters of the mutually facing rims of the annular disk and of the annular flange being dimensioned such that both parts bear against each other with their free peripheral areas.

This embodiment is distinguished by a particularly simple design, the one-piece annular disk being twistable and displaceable.

In the case of the second embodiment, the annular disk is disposed in the damper casing with radial play, the damper plunger protruding with radial play through the annular disk.

Moreover, the one-piece annular disk can exhibit an oblong recess extending through the center of the annular disk, thereby allowing a large horizontal movement in the longitudinal direction of the recess.

The annular flange of the circumferential wall also serves, in the second embodiment, as an abutment against an upwardly directed movement of the tubes.

In both embodiments, each tube can be provided with a base, the bases lying one upon the other.

Both in the first and in the second embodiment, when the tubes are in fact equipped with bases, the interspaces between the tubes and between the outermost tube and the circumferential wall and the innermost tube and the damper plunger can be filled with damping media of different damping characteristics, in particular of different viscosity.

Finally, in all embodiments, the tubes can exhibit radial pass-through openings for the damping medium, the size of which is dimensioned in dependence on the desired damping characteristics.

Figure 2:
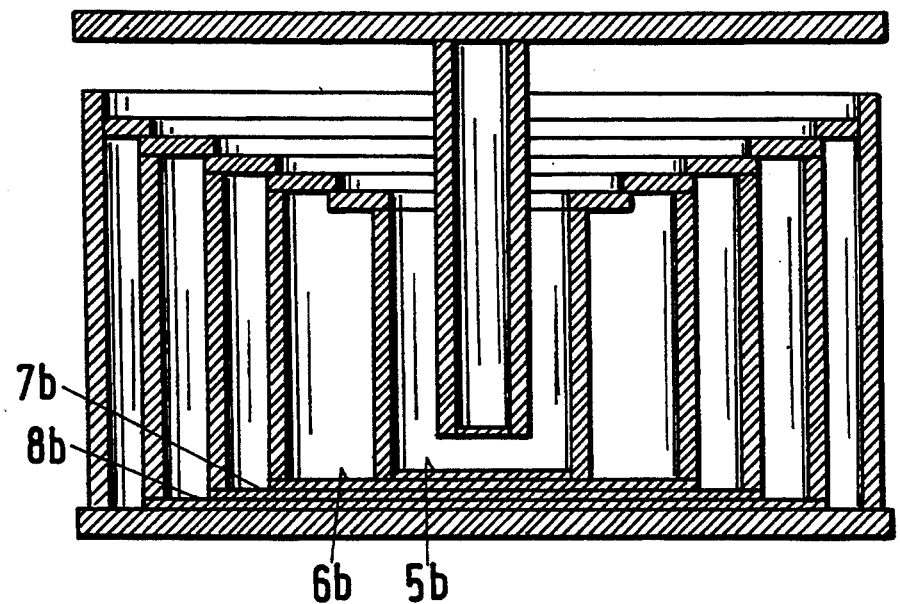
Figure 3:
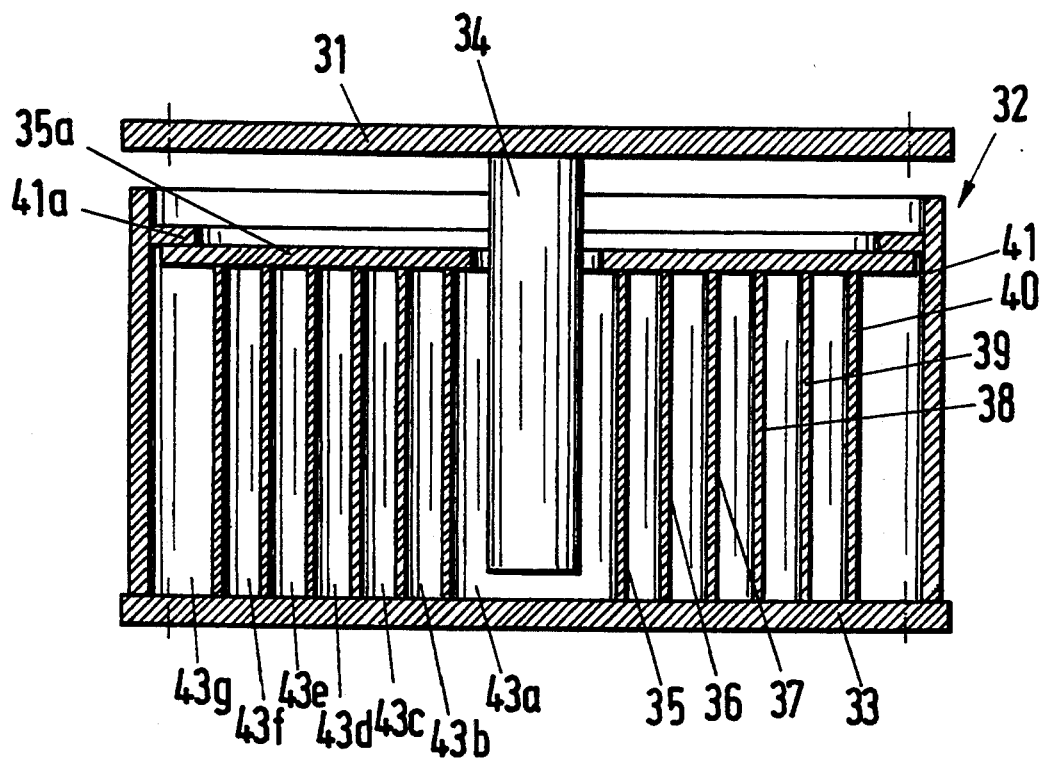
Figure 4:
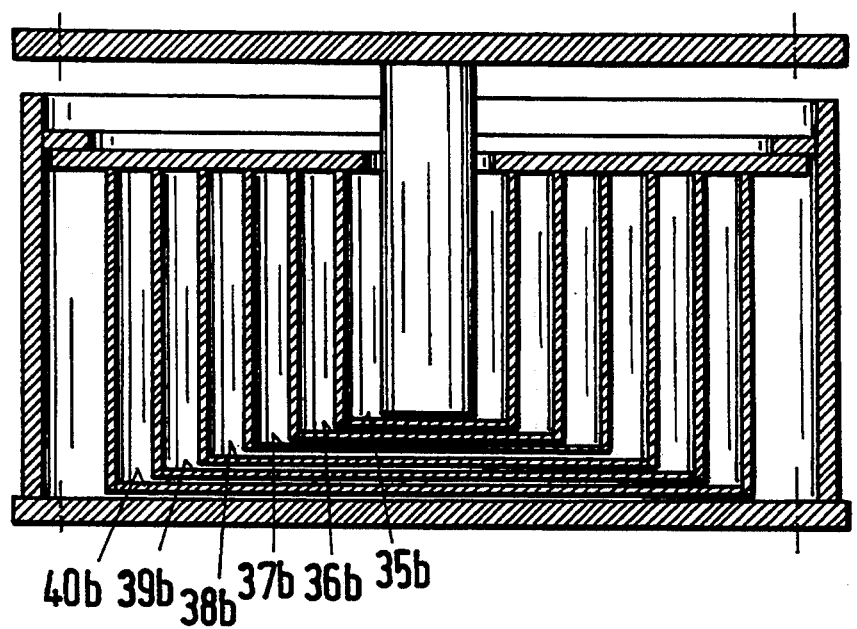
Figure 5:
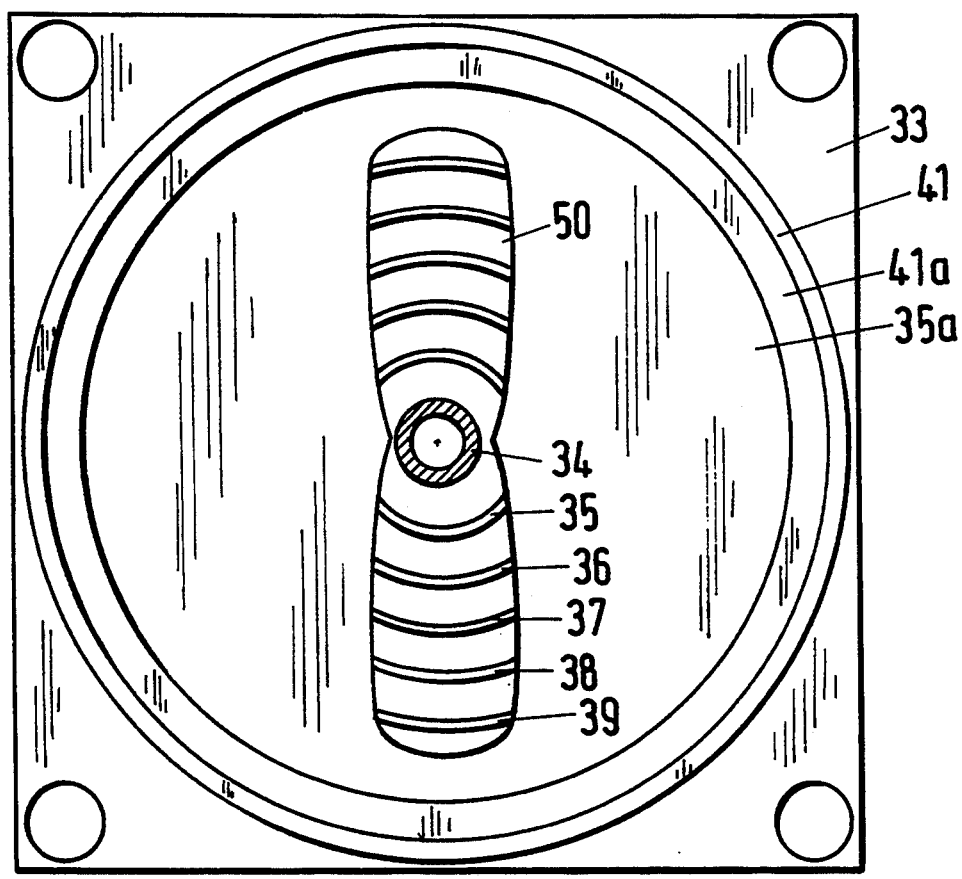

The invention is described below in greater detail and solely on an exemplary basis with reference to the drawings, in which:

FIG. 1 shows a radial section through a damper of a first embodiment,

FIG. 2 shows a radial section through a damper in the embodiment according to FIG. 1, each tube being equipped however with a baseplate, FIG. 3 shows a radial section through a damper of a second embodiment, FIG. 4 shows a radial section through the damper according to FIG. 3, each tube being equipped however, once again, with a baseplate, and FIG. 5 shows a view from above onto the damper of FIGS. 3 and 4, the coverplate of the damper plunger being omitted.

According to FIG. 1, the vibration damper comprises a damper casing 2, the cylindrical circumferential wall 9 of which is firmly connected to a baseplate 3, and a damper plunger 4 with associated coverplate 1.

In the interior of the damper casing 2, there are disposed, in the represented case, four concentric tubes 5 to 8 of circular cross-section, which lie on the baseplate 3 and are freely mutually displaceable horizontally in two dimensions. The annular space 12a between the innermost tube 5 and the damper plunger 4 and the annular spaces 12b to 12d between the tubes 5 to 8 and the annular space 12e between the outermost tube 8 and the circumferential wall 9 are filled with viscous damping medium (not shown). The damper plunger 4 protrudes from above into the medium located in the annular space 12a.

If necessary, an equalization of the damping medium located and compressed in the various part-spaces can be effected, where the fill level is relatively high, over the upper free rims of the tubes 5 to 8 and, where the fill level is relatively low, through pass-through openings (not represented) provided for this occasion in the indivudual tubes 5 to 8.

In the case of the shown illustrative embodiment, each tube 5 to 8 is equipped at its upper rim area with an annular flange 5a to 8a as a supporting part, the annular flange 5a of the innermost tube 5 being aligned radially outwards and the annular flanges 6a to 8a of the other tubes 6 to 8 being aligned radially inwards.

As also demonstrated by FIG. 1, the outer and inner diameters of the annular flanges 5a to 8a are matched in such a way that the annular flanges in each case successively overlap. Here, the outer diameter of each flange is greater than the inner diameter of the annular flange directly following in the radial direction. The total arrangement of the annular flanges is supported at the upper rim area of the circumferential wall 9 by means of an annular flange 9a, which is aligned radially inwards.

Since the damping medium within the individual spaces, between two tubes each, is no longer able, due to the axial supporting of the tubes, to rise upwards, a considerable improvement in characteristics over extended periods of time is achieved; in the event of a horizontal load, the damping remains virtually constant, even where the horizontal relative movements are large. Where load is applied vertically to the damper, the damping resistance, in addition to the viscosity of the damping medium, is primarily determined by the distance between the damper plunger 4 and the innermost tube 5. Since vertical movements of the tubes 5 to 8 are prevented, the vertical value, also, of the damping resistance is constant in the event of large relative movements.

The embodiment of FIG. 2 corresponds basically to that of FIG. 1. However, the lower ends of the tubes 5 to 8 are respectively closed off by means of a baseplate 5b to 8b, which baseplates are disposed one on top of the other, so that the tubes are fitted one inside the other by their respective baseplate and a downwardly closed annular space 12a and, additionally, annular spaces 12b to 12e are formed. The tubes 5 to 8 can be freely displaced relative to one another in the horizontal direction, yet are not displaceable in the axial direction (in the vertical direction).

The embodiment according to FIG. 2 offers the advantage over the embodiment according to FIG. 1 that the various spaces can be filled with damping media of different damping characteristics, in particular of different viscosity, so that the damping effect or damping characteristics can be varied and adjusted within wider limits.

The embodiment of FIG. 3 likewise corresponds basically to that of FIG. 1. Specifically, the baseplate is in this case denoted by 33, the circumferential wall by 41, the coverplate by 31 and the damper plunger by 34.

In the damper casing 32, six tubes 35 to 40 are in this case disposed concentrically to one another. In this configuration, annular spaces 43a–43g are formed between the tubes 35 to 40 or between the circumferential wall 41 of the damper casing and the outermost tube 40 and between the damper plunger 34 and the innermost tube 35.

In the embodiment according to FIG. 3, all tubes 35 to 40 are jointly supported in the axial direction by a common upper plate 35a, this plate 35a in turn being supported against the damper casing 32 by means of the casing's circumferential wall 41. The plate 35a is configured as an annular disk, which is dimensioned such that it is disposed with radial play in the damper casing 32. The annular disk 35a is supported by means of an annular flange 41a which, at the upper area of the circumferential wall 41, is aligned inwards.

The embodiment of FIG. 3 essentially shows the same working method as the embodiment of FIG. 1 or FIG. 2, the possible vibration amplitude however, due to the smallness of the abovementioned radial play, initially being curtailed in relation to the embodiments of FIG. 1 or FIG. 2. Large vibration amplitudes are permissible in the case of the embodiment of FIG. 5.

The embodiment of FIG. 4 corresponds basically to that of FIG. 3. As in embodiment of FIG. 2 however, the tubes 35 to 40 are in each case closed off at their lower end by baseplates 35b to 40b, so that the advantages are once again obtained as set out above in connection with the embodiment of FIG. 2.

The embodiments of FIGS. 3 and 4 are distinguished by a particularly simple design which can be produced from simple individual components.

In the case of the embodiments of FIGS. 2 and 4, a damping resistance W can be obtained by a suitable choice of viscosity of the damping media, which damping resistance varies with the horizontal displacement of the damper plunger. In this way, a path-progressive damping, for example, can be realized. In all embodiments, the path-progressive damping can additionally be further influenced by the fact that the radial distances between the tubes can be dimensioned, in all embodiments, in dependence on the desired damping characteristics and the viscosity of the damping medium or media.

In the case of the embodiments of FIGS. 3 and 4, the plate 35a is not only movable in a translatory motion, but is also rotatably mounted or inserted. Where the recess 50 of the plate 35a is of an oval or oblong design, its longitudinal extent determines the maximum possible horizontal path of the damper plunger 34. The latitudinal extent is somewhat greater than the outer diameter of the damper plunger 34. In the event of horizontal movements of the damper plunger, the plate 35a is rotated in this way such that the longitudinal axis of the recess coincides with the direction of the movement of the damper plunger.

In all embodiments, finally, any optional number of tubes can be disposed in the interior of the damper casing. The tubes can also in each case exhibit radial pass-through openings (not shown) for the damping medium, the size which openings is dimensioned in dependence on the desired damping characteristics.

We claim:

1. A horizontally and vertically acting viscous vibration damper for damping vibrations of large masses exhibiting large amplitudes, comprising a pot-shaped damper casing including a base and filled with a viscous damping medium, a damper plunger protruding into the damper casing and a plurality of tubes disposed between an inner wall of the damper casing and the damper plunger, which tubes are disposed coaxially to and at a distance from the damper plunger and freely movable parallel to the base of the damper casing, wherein each of the tubes, at ends facing away from the base of the damper casing and the circumferential wall of the damper casing, is allocated a supporting part configured as an annular flange, by means of which the tubes are supported in the axial direction against the damper casing, wherein the annular flange of an innermost tube is aligned outwards and the annular flanges of the remaining tubes are aligned inwards, the diameters of free peripheral rims of the annular flanges being dimensioned such that a free peripheral area of each annular flange bears against an adjacent annular flange or its free peripheral area.

2. The damper as claimed in claim 1 wherein the tubes are disposed at a radial distance apart from and concentrically to the damper plunger, annular spaces between the tubes, between the innermost tube and the damper plunger and between an outermost tube and the wall of the damper casing being filled at least partially with viscous damping medium.

3. The damper as claimed in claim 2 wherein the radial distances between the innermost tube and the damper plunger, between the tubes and between the outermost tube and the wall of the damper casing are equally dimensioned.

4. The damper as claimed in claim 2 wherein the radial distances between the innermost tube and the damper plunger, between the tubes and between the outermost tube and the circumferential wall of the damper casing are differently dimensioned.

5. The damper as claimed in claim 2 wherein the radial distances between the innermost tube and the damper plunger, between the tubes and between the outermost tube and the circumferential wall of the damper casing are dimensioned in dependence on desired damping characteristics, viscosity of the damping medium or both desired damping characteristics and viscosity of the damping medium.

6. The damper as claimed in claim 2 wherein each tube is provided with a base, the bases of mutually adjacent tubes lying one upon the other.

7. A horizontally and vertically acting viscous vibration damper for damping vibrations of large masses exhibiting large amplitudes, comprising a pot-shaped damper casing including a base and filled with a viscous damping medium, a damper plunger protruding into the damper casing and a plurality of tubes disposed between an inner wall of the damper casing and the damper plunger, which tubes are disposed coaxially to and at a distance from the damper plunger and freely movable parallel to the base of the damper casing, wherein the tubes, at ends facing away from the base of the damper casing and the circumferential wall of the damper casing, are allocated a supporting part, by means of which the tubes are supported in the axial direction against the damper casing, the supporting parts of the tubes being configured as a one-piece annular disk common to all tubes and the supporting part of the wall of the damper casing as an inwardly directed annular flange, diameters of mutually facing rims of the annular disk and of the annular flange being dimensioned such that both parts bear against each other or their respective free peripheral areas.

8. The damper as claimed in claim 7 wherein the one-piece annular disk is provided with an oblong recess guided through its center, such that the damper plunger is movable in a longitudinal direction of this recess along horizontal paths.

* * * * *